United States Patent
Naka et al.

(10) Patent No.: US 10,558,876 B2
(45) Date of Patent: Feb. 11, 2020

(54) AUTOMATIC DRIVING ASSISTANCE DEVICE AND AUTOMATIC DRIVING ASSISTANCE METHOD

(71) Applicant: DENSO TEN Limited, Kobe-shi, Hyogo (JP)

(72) Inventors: Azusa Naka, Kobe (JP); Akiko Muroi, Kobe (JP); Akihide Fujio, Kobe (JP); Minoru Maehata, Kobe (JP)

(73) Assignee: DENSO TEN Limited, Kobe (JP)

( * ) Notice: Subject to any disclaimer, the term of this patent is extended or adjusted under 35 U.S.C. 154(b) by 207 days.

(21) Appl. No.: 15/845,396

(22) Filed: Dec. 18, 2017

(65) Prior Publication Data

US 2018/0218230 A1 Aug. 2, 2018

(30) Foreign Application Priority Data

Feb. 1, 2017 (JP) .................................. 2017-016900

(51) Int. Cl.
| | |
|---|---|
| *G06K 9/00* | (2006.01) |
| *B60W 30/182* | (2012.01) |
| *B60W 50/00* | (2006.01) |
| *B60W 50/08* | (2012.01) |
| *B60W 40/08* | (2012.01) |

(52) U.S. Cl.
CPC ........ *G06K 9/00845* (2013.01); *B60W 30/182* (2013.01); *B60W 40/08* (2013.01); *B60W 50/0098* (2013.01); *B60W 50/08* (2013.01); *B60W 2050/0004* (2013.01); *Y02T 10/7077* (2013.01)

(58) Field of Classification Search
CPC ............ G06K 9/00845; B60W 30/182; B60W 40/08; B60W 50/0098; B60W 50/08; B60W 2050/0004
See application file for complete search history.

(56) References Cited

U.S. PATENT DOCUMENTS

| | | | |
|---|---|---|---|
| 9,809,085 B1* | 11/2017 | Pierce | B60H 1/00742 |
| 2012/0234930 A1* | 9/2012 | Wijaya | G08C 17/00 |
| | | | 236/51 |
| 2014/0218187 A1* | 8/2014 | Chun | G08B 21/06 |
| | | | 340/439 |
| 2017/0140232 A1* | 5/2017 | Banno | G06T 7/70 |
| 2018/0194361 A1* | 7/2018 | Dudar | B60W 50/0098 |
| 2018/0242081 A1* | 8/2018 | Every | H04M 9/082 |

FOREIGN PATENT DOCUMENTS

| | | |
|---|---|---|
| JP | 2006-347531 A | 12/2006 |
| JP | 2010-167963 A | 8/2010 |
| JP | 2011-095891 A | 5/2011 |
| JP | 2015-024746 A | 2/2015 |
| JP | 2015-098218 A | 5/2015 |

* cited by examiner

*Primary Examiner* — Calvin Cheung
(74) *Attorney, Agent, or Firm* — Oliff PLC

(57) ABSTRACT

An automatic driving assistance device includes an information acquirer configured to acquire information on a state of a cabin of a vehicle capable of automatic driving and a modifier configured to modify traveling characteristics in automatic driving according to the state of the cabin of the vehicle.

9 Claims, 5 Drawing Sheets

AUTOMATIC DRIVING ASSISTANCE DEVICE AND AUTOMATIC DRIVING ASSISTANCE METHOD

This nonprovisional application claims priority under 35 U.S.C. § 119(a) on Patent Application No. 2017-016900 filed in Japan on Feb. 1, 2017, the entire contents of which are hereby incorporated by reference.

BACKGROUND OF THE INVENTION

1. Field of the Invention

The present invention relates to technology for assisting the automatic driving of vehicles.

2. Description of Related Art

Japanese Patent Application published as No. 2010-167963 ("JP 2010-167963") discloses a vehicle provided with a mode selection switch (see paragraph 0015 of JP 2010-167963). The mode selection switch is operated by the driver to switch among a normal mode, a sport mode, a snow mode, and an eco mode to select one of those traveling modes. The driver switches traveling modes according to his preferences and the traveling circumstances.

Allowing selection of a traveling mode according to the driver's preferences and the traveling circumstances assists in realizing traveling that suits the driver's preferences and the traveling circumstances. However, whether or not traveling that suits the driver's preferences and the traveling circumstances can be realized depends absolutely on the driver's driving operation. For example, while sporty traveling requires brisk driving operation, traveling on a snowy road or with low fuel consumption requires driving operation free from sudden acceleration or sudden braking. Seen from a different angle, the vehicle disclosed in JP 2010-167963 permits diverse ways of driving depending on the driver's driving operation.

On the other hand, recent years have seen zealous development of vehicles capable of automatic driving. In automatic driving, driving operation which would otherwise be performed by the driver are performed on the part of the vehicle. This rids the driver of his driving operation.

Automatic driving no longer allows diverse ways of driving by the driver's driving operation, resulting in monotonous driving in which no consideration is given to the state of the cabin of the vehicle. This diminishes the fun and comfort of driving experienced by the passengers of the vehicle.

SUMMARY OF THE INVENTION

The present invention aims to provide an automatic driving assistance technology that offers an enhanced effect of hospitality to passengers of vehicles.

According to one aspect of the present invention, an automatic driving assistance device includes: an information acquirer configured to acquire information on a state of a cabin of a vehicle capable of automatic driving; and a modifier configured to modify traveling characteristics in automatic driving according to the state of the cabin of the vehicle.

According to another aspect of the present invention, an automatic driving assistance method includes: an information acquiring step of acquiring information on a state of a cabin of a vehicle capable of automatic driving; and a modifying step of modifying traveling characteristics in automatic driving according to the state of the cabin of the vehicle.

DETAILED DESCRIPTION OF PREFERRED EMBODIMENTS

Hereinafter, illustrative embodiments of the present invention will be described in detail with reference to the accompanying drawings.

Figure 1:
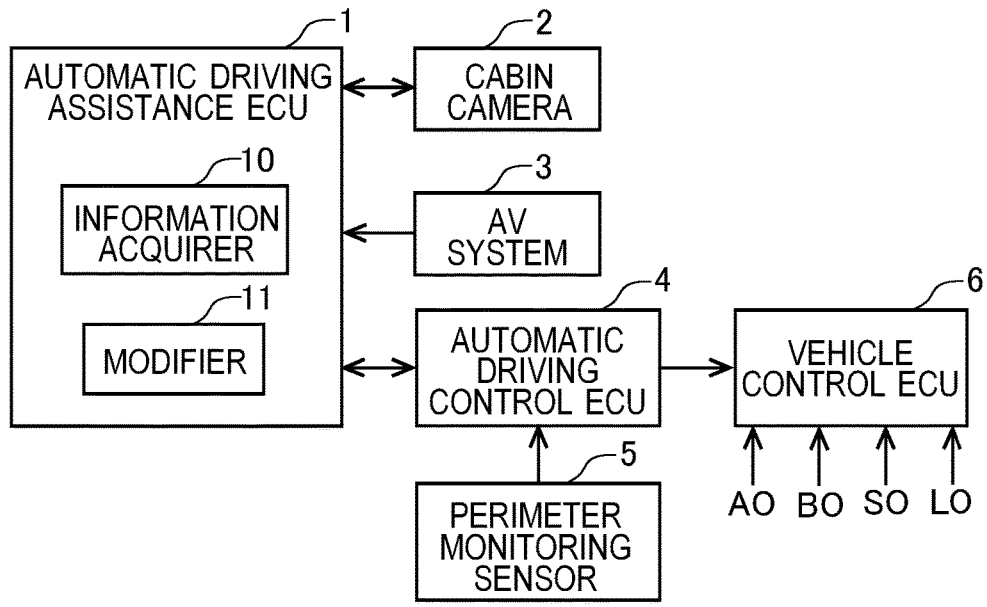
FIG. 1 is a diagram showing the configuration of an automatic driving assistance device according to a first embodiment.

1. Configuration of Automatic Driving Assistance Device According to 1st Embodiment FIG. 1 is a diagram showing the configuration of an automatic driving assistance ECU (electric control unit) 1 as an automatic driving assistance device according to a first embodiment of the present invention. The automatic driving assistance ECU 1 includes an information acquirer 10 and a modifier 11. The automatic driving assistance ECU 1 is mounted on a vehicle along with a cabin camera 2, an AV (audiovisual) system 3, an automatic driving control ECU 4, a perimeter monitoring sensor 5, and a vehicle control ECU 6. A vehicle mounted with the automatic driving assistance ECU 1 is mounted also with the automatic driving control ECU 4, and is thus a vehicle that is capable of automatic driving.

The cabin camera 2 takes an image of the cabin of the vehicle, and transmits it to the information acquirer 10 in the automatic driving assistance ECU 1. The taken image that is transmitted from the cabin camera 2 to the information acquirer 10 in the automatic driving assistance ECU 1 is one example of information on the state of the cabin of the vehicle.

The AV system 3 transmits genre information, which is information on the genre of the music that is being played back, to the information acquirer 10 in the automatic driving assistance ECU 1. The genre information that is transmitted from the AV system 3 to the information acquirer 10 in the automatic driving assistance ECU 1 is one example of information on the state of the cabin of the vehicle.

The AV system 3 has a hands-free telephone conversation function and, when a hands-free telephone conversation is being conducted by wireless communication with a mobile telephone or a smartphone, the AV system 3 transmits information (hands-free information) indicating that a hands-free telephone conversation is being conducted to the information acquirer 10 in the automatic driving assistance ECU 1. The hands-free information that is transmitted from the AV system 3 to the information acquirer 10 in the automatic driving assistance ECU 1 is one example of information on the state of the cabin of the vehicle.

The information acquirer 10 in the automatic driving assistance ECU 1 acquires information on the state of the cabin of the vehicle. The modifier 11 in the automatic driving assistance ECU 1 refers to the information acquired by the information acquirer 10 and, according to the state of the cabin of the vehicle, modifies traveling characteristics in automatic driving. Specifically, the modifier 11 in the automatic driving assistance ECU 1 receives from the automatic driving control ECU 4 information as to which of an automatic driving mode and a manual driving mode is in effect and, if the automatic driving mode is in effect, transmits to the automatic driving control ECU 4, as necessary, a modification instruction to modify the traveling characteristics according to the state of the cabin of the vehicle.

The automatic driving control ECU 4 chooses either the automatic driving mode or the manual driving mode by judging whether or not automatic driving is appropriate based on the result of monitoring by the perimeter monitoring sensor 5, and transmits the result of the choice to the modifier 11 in the automatic driving assistance ECU 1. The automatic driving control ECU 4 also generates, in the automatic driving mode, a control signal based on the result of monitoring by the perimeter monitoring sensor 5, and outputs the control signal to the vehicle control ECU 6.

The perimeter monitoring sensor 5 monitors the condition around the vehicle with an image-taking device, a millimeter wave radar, or the like.

In the manual driving mode, the vehicle control ECU 6 controls the direction, speed, and the like of the vehicle based on a signal AO indicating the amount of operation of the acceleration pedal of the vehicle by the driver, a signal BO indicating the amount of operation of the brake pedal of the vehicle by the driver, a signal SO indicating the amount of operation of the steering wheel of the vehicle by the driver, and a signal LO indicating the manner of operation of the shift lever of the vehicle by the driver. On the other hand, in the automatic driving mode, the vehicle control ECU 6 controls the direction, speed, and the like of the vehicle based on a control signal output from the automatic driving control ECU 4. The control signal output from the automatic driving control ECU 4 to the vehicle control ECU 6 in the automatic driving mode includes an acceleration parameter corresponding to the amount of operation of the acceleration pedal which varies in accordance with the driving operation by the driver in manual driving, a deceleration parameter corresponding to the amount of operation of the brake pedal which varies in accordance with the driving operation by the driver in manual driving, a steering angle parameter corresponding to the amount of operation of the steering wheel which varies in accordance with the driving operation by the driver in manual driving, and a shift parameter corresponding to the manner of operation of the shift lever of the vehicle by the driver.

Thus, whereas in the manual driving mode, the driver performs the driving operation of the vehicle, in the automatic driving mode, the automatic driving control ECU 4 performs the driving operation of the vehicle.

Figure 2:
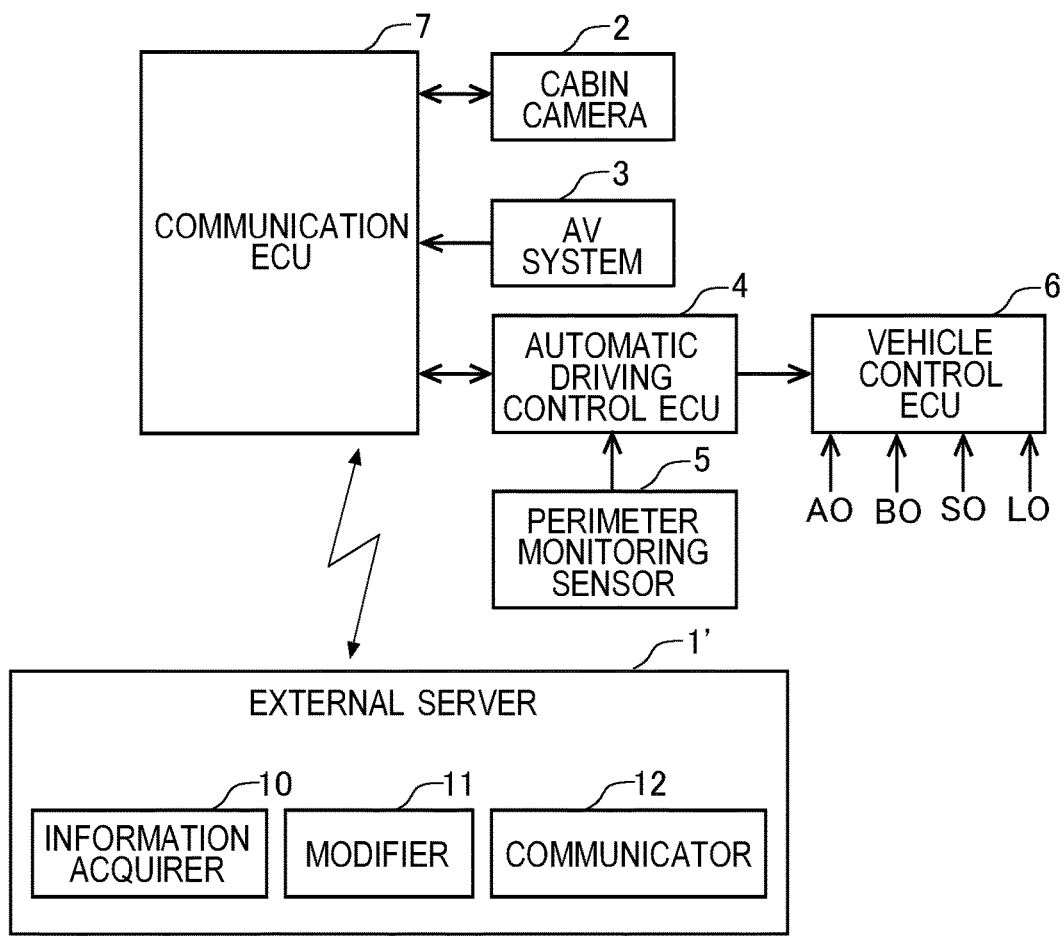
FIG. 2 is a diagram showing a modified example of the automatic driving assistance device according to the first embodiment.

FIG. 2 is a diagram showing the configuration of an external server 1' as a modified example of the automatic driving assistance device according to the first embodiment. The external server 1' includes an information acquirer 10, a modifier 11, and a communicator 12.

The information acquirer 10 in the external server 1', which is not mounted on a vehicle, acquires information on a state of the cabin of the vehicle by way of communication between the communicator 12 and a communication ECU 7 mounted on the vehicle. The modifier 11 in the external server 1' refers to the information acquired by the information acquirer 10, and also uses communication between the communicator 12 and the communication ECU 7 mounted on the vehicle, to modify traveling characteristics in automatic driving.

Figure 3:
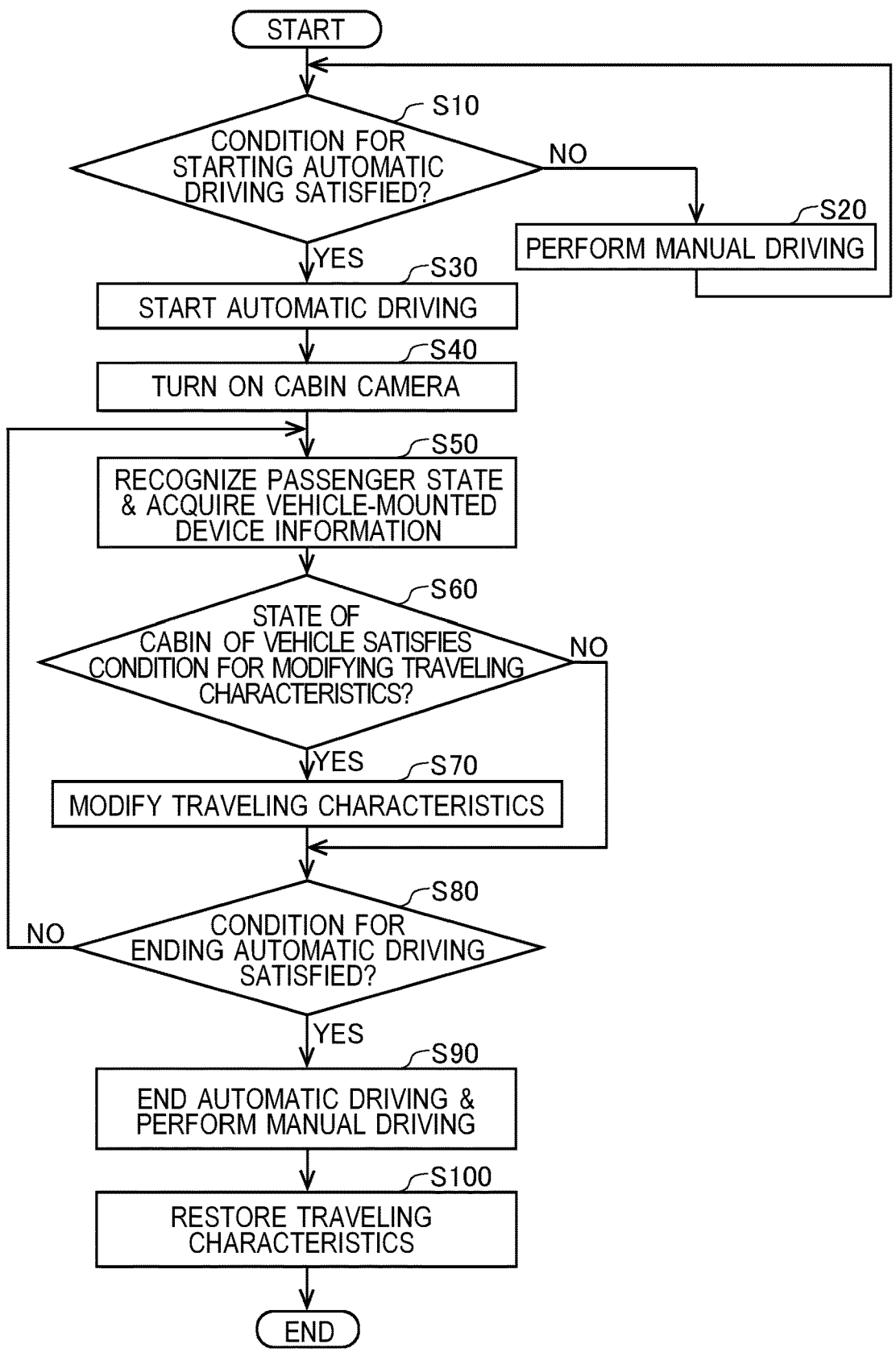
FIG. 3 is a flow chart showing an exemplary operation of the automatic driving assistance device and the like according to the first embodiment.

2. Exemplary Operation of Automatic Driving Assistance Device According to 1st Embodiment FIG. 3 is a flow chart showing an example of the operation of the automatic driving assistance device and the like according to the first embodiment. When the ignition key of the vehicle is turned on, the operation depicted in the flow chart in FIG. 3 starts.

First, based on the result of monitoring by the perimeter monitoring sensor 5, the automatic driving control ECU 4 checks whether or not a condition for starting automatic driving is satisfied (step S10). For example, when the vehicle is traveling on an expressway, it can be taken as satisfying a condition for starting automatic driving. For another example, when the vehicle is traveling on an expressway and in addition if there is present a vehicle ahead with which the inter-vehicle distance is less than a predetermined value, it can be taken as satisfying the condition for starting automatic driving. A condition for starting automatic driving can be set in accordance with the performance of automatic driving of the vehicle. For example, when the driver has chosen automatic driving and set a destination and, optionally, in addition if the route to the destination permits automatic driving (or part of the route permits automatic driving, in which case only while traveling that part of the route), it can be taken as satisfying the condition for starting automatic driving.

If no condition for starting automatic driving is satisfied, the automatic driving control ECU 4 chooses the manual driving mode, and a return is made to step S10. Thus, manual driving is performed (step S20), and thereafter a return is made to step S10.

If a condition for starting automatic driving is satisfied, the automatic driving control ECU 4 chooses the automatic driving mode. Thus, automatic driving is started (step S30).

Next, the information acquirer 10 turns on the cabin camera 2 (step S40). Incidentally, the AV system 3 is turned on automatically when the ignition key is turned on.

Next, the information acquirer 10 recognizes the state of the passengers of the cabin of the vehicle based on the taken image acquired from the cabin camera 2, and acquires genre information and hands-free information from the AV system 3 (step S50).

Next, the modifier 11 judges whether or not the state of the cabin of the vehicle is one that satisfies a condition for modifying the traveling characteristics (step S60).

If the state of the cabin of the vehicle is one that satisfies a condition for modifying the traveling characteristics, the modifier 11 modifies the traveling characteristics (step S70). Incidentally, if the current traveling characteristics are already just what they will be like when modified, then the current traveling characteristics are maintained.

The traveling characteristics that can be modified at step S70 include, for example, the acceleration/deceleration characteristics represented by the above-mentioned acceleration and deceleration parameters, and the course, speed, and the like on the occasion of a right turn, a left turn, or a curve represented by the above-mentioned acceleration, deceleration, and steering angle parameters. For example, the automatic driving control ECU 4 can perform, to obtain traveling characteristics offering enhanced quietness, operation involving starting to apply the brake earlier and then depressing it slowly down, operation involving, likewise, depressing the accelerator slowly down, and, when making a turn, operation involving starting to decelerate earlier and then decelerating slowly while turning the steering wheel, and then releasing the accelerator slowly while turning back the steering wheel; when changing lanes without deceleration, such steering operation as to change lanes slowly while traveling an ample distance; and so forth. Specifically, the automatic driving control ECU 4 modifies an automatic driving operation characteristic which is the time-series variation pattern of at least one of the above-mentioned acceleration, deceleration, and steering angle parameters. By modifying the time-series variation pattern of the above-mentioned acceleration parameter, it is possible to control and limit the variation speed of acceleration operation (whether to perform acceleration operation slowly or quickly). Likewise, by modifying the time-series variation pattern of the above-mentioned deceleration parameter, it is possible to control and limit the variation speed of braking operation (whether to perform braking operation slowly or quickly). Likewise, by modifying the time-series variation pattern of the above-mentioned steering angle parameter, it is possible to control and limit the variation speed of steering operation (whether to perform steering operation slowly or quickly).

Also by modifying the hardness of the suspension, it is possible to modify the traveling characteristics.

In a case where the vehicle is an electric vehicle or a hybrid vehicle, and is provided with a traveling sound generating device which generates traveling sound to alert pedestrians and the like to the presence of the vehicle, also by the modifier 11 modifying at least one of the sound volume and sound quality of the traveling sound generated by the traveling sound generating device, it is possible to modify the traveling characteristics. For example, by reducing the sound volume or the proportion of deep bass sound, it is possible to achieve enhanced quietness. This is convenient, for example, in a case where no modification is desired in the acceleration/deceleration characteristics.

In a case where the vehicle is a hybrid vehicle, also by the modifier 11 modifying the distribution ratio between electric driving and engine driving, it is possible to modify the traveling characteristics. For example, by increasing the proportion of electric driving, it is possible to achieve enhanced quietness. This is convenient, for example, in a case where no major modification is desired in the acceleration/deceleration characteristics.

On the other hand, if the state of the cabin of the vehicle is not one that satisfies a condition for modifying the traveling characteristics, step S70 is not performed, but a jump is made directly from step S60 to step S80.

Examples of conditions for modifying the traveling characteristics will now be given. Conditions for modifying the traveling characteristics are stored by the modifier 11 on a nonvolatile basis.

The 1st priority: When a hands-free telephone call is received during automatic driving, the traveling characteristics are modified to those offering enhanced quietness.

The 2nd priority: When it is detected, based on the taken image obtained by the cabin camera 2, that the passengers include at least either a sleeping person or an unwell person, the traveling characteristics are modified to those offering enhanced quietness. Whether a passenger is sleeping or not can be judged based on the countenance and movement of the passenger. Likewise, whether a passenger is unwell or not can be judged based on the countenance and movement of the passenger.

The 3rd priority: Based on the taken image obtained by the cabin camera 2, the person on the driver's seat is subjected to face verification, and the traveling characteristics are modified to those registered beforehand for that person. Accordingly, for example, the information acquirer 10 can be configured to have a face verification function using a taken image and the modifier 11 can be configured to have a memory which stores persons and cruising modes in an associated manner on a nonvolatile basis. Instead of face verification, any other individual verification technology may be used. For example, the steering wheel may be furnished with an individual verification device relying on fingerprints.

The 4th priority: When it is detected, based on the taken image obtained by the cabin camera 2, the passengers include at least one of an aged person and an infant, the traveling characteristics are modified to those offering enhanced quietness. Whether a passenger is an aged person or not can be judged by face pattern matching. Likewise, whether a passenger is an infant or not can be judged by face pattern matching.

The 5th priority: When it is detected, based on the taken image obtained by the cabin camera 2, that the passengers are having a lively conversation, the traveling characteristics are modified to those offering enhanced quietness. Whether or not a lively conversation is taking place can be judged, for example, based on the countenance and movement of the passengers.

The 6th priority: The traveling characteristics are modified in accordance with the music being played back by the AV system 3. For example, when classical music is playing, the traveling characteristics are modified to those offering enhanced quietness, and when rock music is playing, the traveling characteristics are modified to those which allows sporty traveling.

At step S70, the higher the order of priority of a condition, it is applied with higher priority. It is preferable that the order of priority be changeable by operation of a passenger. It is preferable that the operation input device that accepts operation for modifying the order of priority not be a dedicated operation input device but be shared as an operation input device for another device (for example, the AV system 3).

Now, with reference back to FIG. 3, the operation at step S80 and the following steps will be described. Based on the result of monitoring by the perimeter monitoring sensor 5, the automatic driving control ECU 4 checks whether or not a condition for ending automatic driving is satisfied (step S80). For example, when the vehicle is no longer traveling on an expressway, it may be taken as satisfying a condition for ending automatic driving. For another example, even when the vehicle is still traveling on an expressway, if there is no longer present a vehicle ahead with which the inter-vehicle distance is less than a predetermined value, it can be taken as satisfying a condition for ending automatic driving. Also, when the driver performs driving operation (for example, braking operation), it can be taken as satisfying a condition for ending automatic driving. A condition for ending automatic driving can be set in accordance with the performance of automatic driving of the vehicle.

If no condition for ending automatic driving is satisfied, a return is made to step S50. On the other hand, if a condition for ending automatic driving is satisfied, automatic driving is ended, and manual driving is performed (step S90). Then, the traveling characteristics (standard traveling characteristics) as they were when the operation depicted in the flow shown in FIG. 3 started are restored (step S100), and the flow ends.

Owing to the automatic driving assistance ECU 1 performing the operation depicted in the flow chart shown in FIG. 3 as described above, traveling characteristics in automatic driving are modified in accordance with the state of the cabin of the vehicle, and this contributes to an enhanced effect of hospitality to the passengers of the vehicle.

With the vehicle disclosed in JP 2010-167963, it may occur, depending on the skills of the driver, that desired traveling characteristics cannot be obtained. On the other hand, with the automatic driving assistance ECU 1, by modifying parameters (for example, the above-mentioned acceleration, deceleration, and steering angle parameter, and the like) that correspond to the amounts of operation which vary in accordance with the driving operation by the driver in manual driving, it is possible to obtain traveling characteristics similar to those obtained when an ideal driver is driving. This contributes to a further enhanced effect of hospitality to the passengers of the vehicle.

Moreover, the automatic driving assistance ECU 1 recognizes the state of the cabin of the vehicle based on information from the cabin camera 2 and the AV system 3, which are time-tested vehicle-mounted devices. Thus, it is very unlikely that the automatic driving assistance ECU 1 fails to operate normally due to a fault in the the cabin camera 2 or the AV system 3. That is, using the automatic driving assistance ECU 1 in combination with the cabin camera 2 and the AV system 3 helps enhance the reliability of the automatic driving assistance ECU 1.

Figure 4:
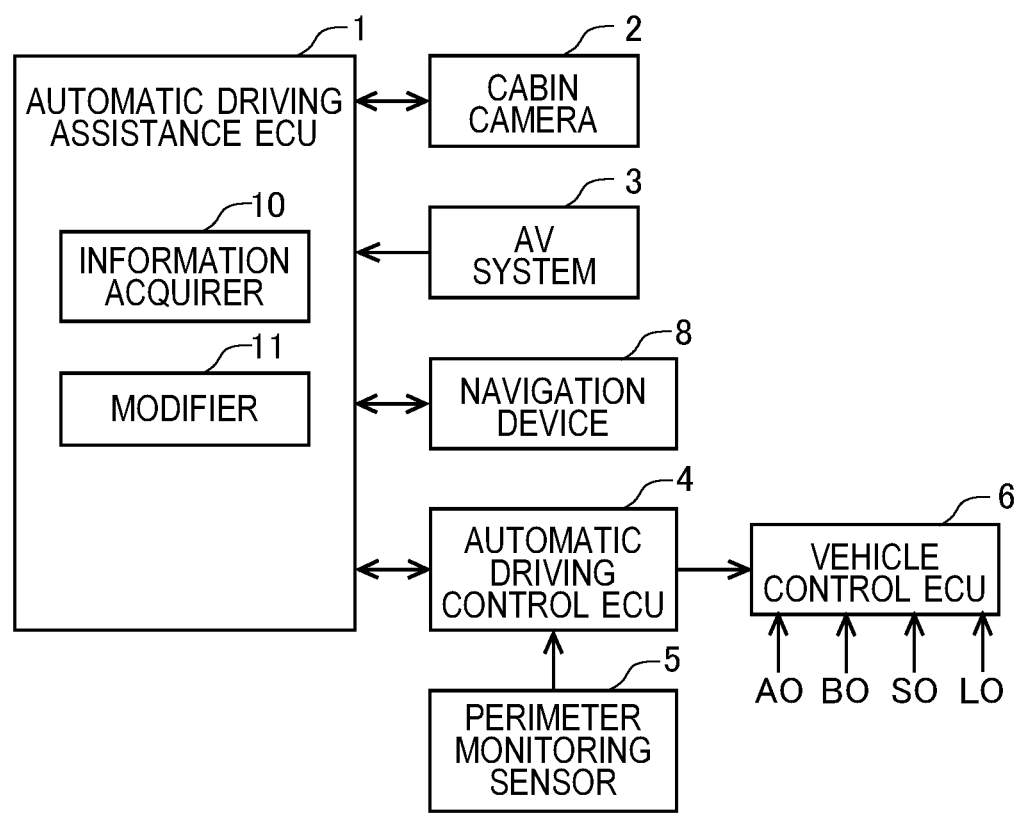
FIG. 4 is a diagram showing the configuration of an automatic driving assistance device according to a second embodiment.

3. Configuration of Automatic Driving Assistance Device According to 2nd Embodiment FIG. 4 is a diagram showing the configuration of an automatic driving assistance ECU 1 as an automatic driving assistance device according to a second embodiment of the present invention. This embodiment differs from the first embodiment in that the modifier 11 has a function of modifying a navigation route presented by a navigation device 8 in accordance with the state of a cabin of a vehicle.

The navigation device 8 stores map information on a nonvolatile basis, and generates a navigation route up to an entered destination. For example, when traveling characteristics are to be modified to those offering enhanced quietness, the modifier 11 instructs the navigation device 8 to modify the navigation route to one that requires fewer changes in speed and produces less jolting. It is preferable that the AV system 3 and the navigation device 8 be integrated into a single unit of equipment.

Figure 5:
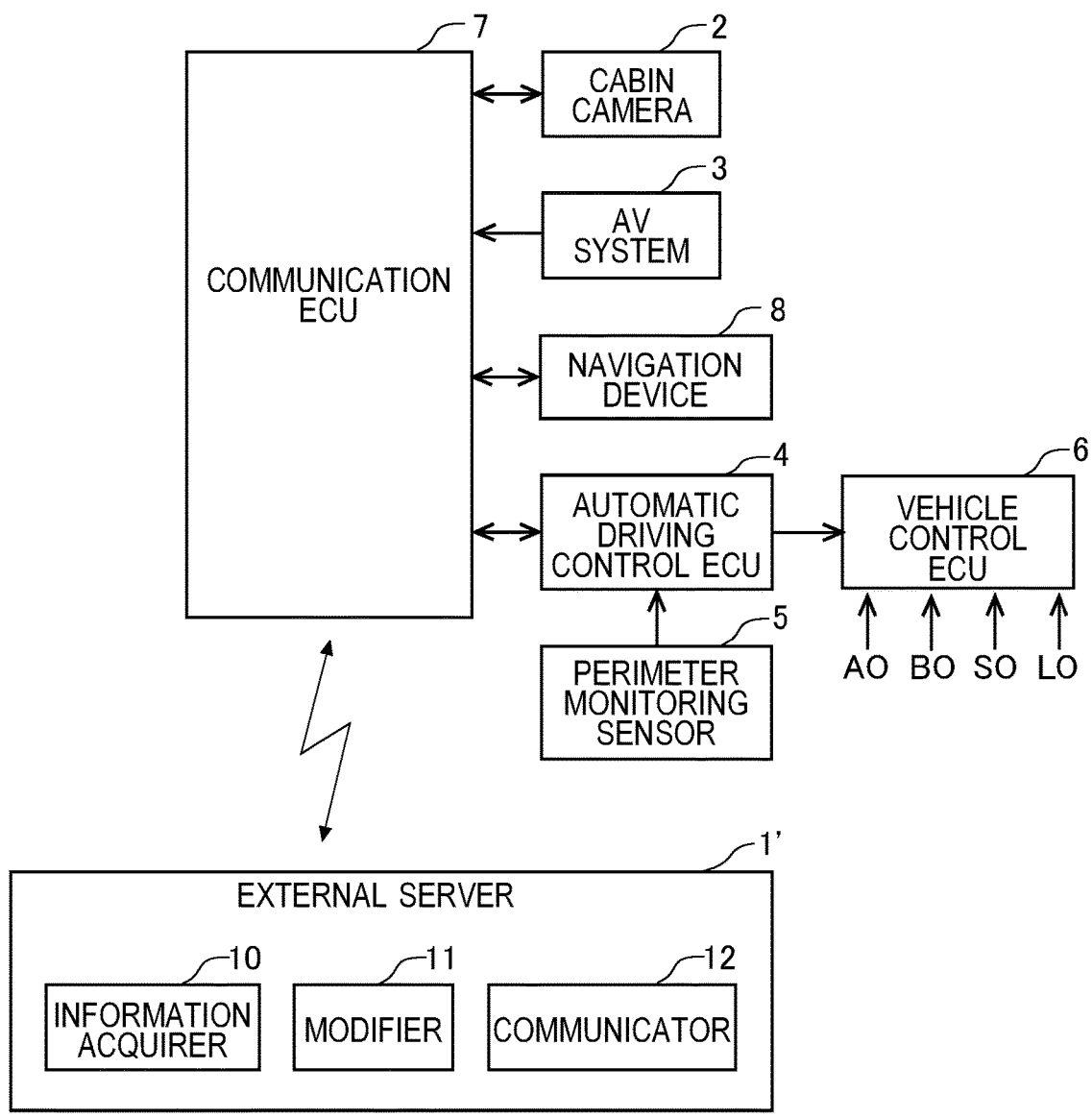
FIG. 5 is a diagram showing a modified example of the automatic driving assistance device according to the second embodiment.

Also in the second embodiment, an automatic driving assistance device may be built by use of an external server 1' as shown in FIG. 5.

Figure 6:
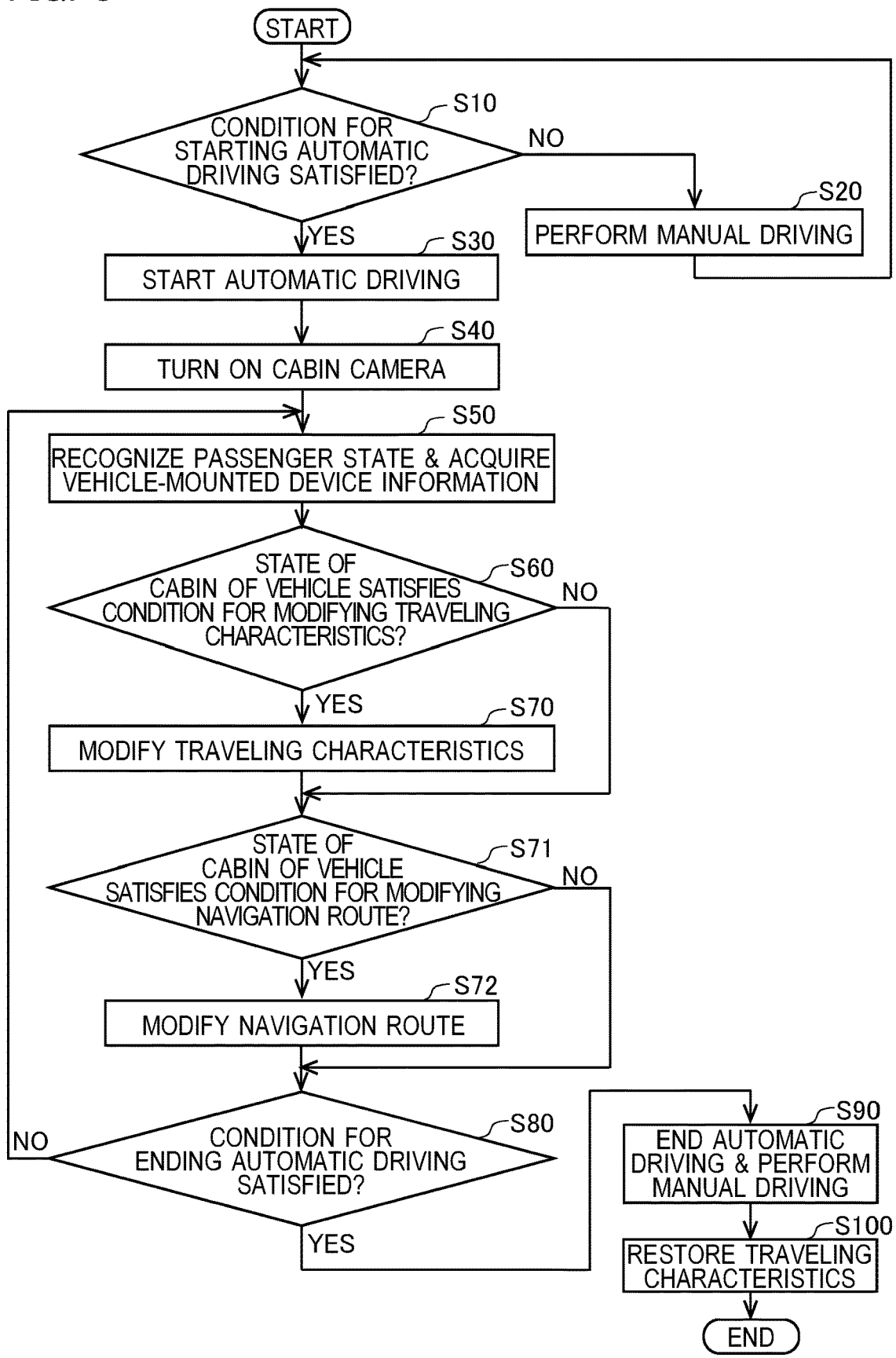
FIG. 6 is a flow chart showing an exemplary operation of the automatic driving assistance device and the like according to the second embodiment.

4. Exemplary Operation of Automatic Driving Assistance Device According to 2nd Embodiment FIG. 6 is a flow chart showing an example of the operation of the automatic driving assistance device and the like according to the second embodiment. Compared with the flow chart shown FIG. 3, the flow chart shown in FIG. 6 additionally has steps S71 and S72 between steps S70 and S80.

At step S71, the modifier 11 checks whether or not the state of the cabin of the vehicle is one that satisfies a condition for modifying the navigation route.

At step S72, if the state of the cabin of the vehicle is one that satisfies a condition for modifying the navigation route, the modifier 11 modifies the navigation route. If the current navigation route is already just what it will be like when modified, then the current navigation route is maintained.

With respect to the exemplary conditions for modifying the traveling characteristics mentioned in connection with the first embodiment, the 6th priority may be ranked down to the 7th, with the 6th assigned instead to modifying the traveling characteristics in accordance with the traveling purpose or route information. For example, when the destination is a hospital, the traveling characteristics can be modified to those offering enhanced quietness.

According to this embodiment, the automatic driving assistance ECU 1 can modify not only the traveling characteristics but also the navigation route. This contributes to a further enhanced effect of hospitality to the passengers of the vehicle.

5. Modified Examples

The embodiments described above should be considered to be in every aspect illustrative and not restrictive, and it should be understood that the technical scope of the present invention is defined not by the description of embodiments given above but by the appended claims and encompasses any modifications made in the sense and scope equivalent to those of the claims.

For example, the modifier 11 can determine the number of passengers based on a taken image obtained from the cabin camera 2, then, based on the number of passengers, estimate the load capacity of the vehicle, and then, if the load capacity of the vehicle is high, modify the traveling characteristics to those offering a high torque. In this way, it is possible to obtain traveling characteristics adequate to the load capacity of the vehicle, and thus to expect traveling by appropriate automatic driving.

In the embodiments described above, neither a notification is given nor a confirmation is made when the traveling characteristics are modified. Instead, at least either a notification can be given or a confirmation can be made before the traveling characteristics are modified.

In the embodiments described above, a hands-free telephone conversation triggers a modification in the traveling characteristics. Also when a passenger other than the driver conducts an ordinary telephone conversation, the traveling characteristics can be modified to those offering enhanced quietness. Whether or not a passenger other than the driver is conducting an ordinary telephone conversation can be judged, for example, based on a taken image obtained from the cabin camera 2.

Compared with the speed at which to switch to modified traveling characteristics, the speed at which to switch back from the modified traveling characteristics can be set lower. In that way, it is possible to avoid a situation such as where the driver is upset by an abrupt change in traveling characteristics that accompanies a switching to manual driving.

A modification in traveling characteristics can be made while the modification is adjusted according to the condition of another vehicle as grasped by the perimeter monitoring sensor 5 or by inter-vehicle communication.

What is claimed is:

1. An automatic driving assistance device comprising:
   an information acquirer configured to acquire information on a state of a cabin of a vehicle capable of automatic driving; and
   a modifier configured to modify traveling characteristics in automatic driving according to the state of the cabin of the vehicle,
   wherein the modifier modifies a parameter corresponding to an amount of operation that is varied by a driving operation by a driver in manual driving.

2. The automatic driving assistance device according to claim 1, wherein the modifier modifies the parameter according to a load capacity of the vehicle that is estimated from the information acquired by the information acquirer.

3. The automatic driving assistance device according to claim 1, wherein the modifier modifies an automatic driving operation characteristic that is a time-series variation pattern of the parameter.

4. The automatic driving assistance device according to claim 1, wherein the information acquirer acquires a taken image acquired by a camera that takes an image of the cabin of the vehicle.

5. The automatic driving assistance device according to claim 1, wherein the information acquirer acquires information transmitted from a vehicle-mounted device mounted on the vehicle.

6. The automatic driving assistance device according to claim 1, wherein
   the vehicle is an electric vehicle or a hybrid vehicle provided with a traveling sound generating device, and
   the modifier modifies at least sound volume or sound quality of traveling sound generated by the traveling sound generating device.

7. The automatic driving assistance device according to claim 1, wherein
   the vehicle is a hybrid vehicle, and
   the modifier modifies a distribution ratio between electric driving and engine driving.

8. The automatic driving assistance device according to claim 1, wherein
   the vehicle is provided with a navigation device; and
   the modifier modifies a navigation route presented by the navigation device according to the state of the cabin of the vehicle.

9. An automatic driving assistance method, comprising:
   an information acquiring step of acquiring information on a state of a cabin of a vehicle capable of automatic driving; and
   a modifying step of modifying traveling characteristics in automatic driving according to the state of the cabin of the vehicle,
   wherein, in the modifying step, a parameter corresponding to an amount of operation that is varied by a driving operation by a driver in manual driving is modified.

* * * * *